April 13, 1954

J. SIMONET 2,674,888

POWDER BLOCK FRAME

Filed June 10, 1952

INVENTOR
JOSÉ SIMONET

BY *James J. Shanley*

ATTORNEY

Patented Apr. 13, 1954

2,674,888

UNITED STATES PATENT OFFICE 2,674,888

POWDER BLOCK FRAME

José Simonet, Miami, Fla.

Application June 10, 1952, Serial No. 292,631

5 Claims. (Cl. 73—429)

This invention relates to measuring devices and more particularly to devices for accurately determining the volume of a given weight of powdery material.

There are numerous instances in the art where it is necessary to determine the volume of a given weight of powdery material with an extremely high degree of accuracy and without requiring utilization of expensive and intricate precision instruments necessitating time consuming steps by a highly skilled operator. These requirements are frequently met by a druggist or pharmacist in compounding prescriptions including chemicals in powdered form of a quantity designated by weight, or a combination of chemicals which when mixed together constitute powdery material of unknown volume which must be divided into a predetermined number of equal components for insertion into uni-volume capsules.

It is the primary object of the present invention to provide a comparatively simple, inexpensive and easily used instrument for quickly performing the foregoing functions with a high degree of accuracy required in the pharmaceutical art.

Another object is to provide a novel powder block frame or mold of simple design that may be used with comparative ease for determining the volume of an unknown quantity of powdery material with absolute accuracy.

Another object is to provide a powder block frame or mold of the above character that is capable of being manufactured at relatively low cost without compromising its measuring accuracy.

Still another object of the present invention is to provide a novel powder block frame or mold which may be easily removed from the powder block upon a minimum degree of friction between the mold and the powder block leaving the powder block substantially undisturbed so that the character of its formation may be observed and the accuracy of the measurement ascertained.

Other objects and features of the present invention will appear more fully from the following detailed description considered in connection with the accompanying drawing which discloses one embodiment of the invention. It is to be expressly understood, however, that the drawing is designed for purposes of illustration only and not as a definition of the limits of the invention, reference for the latter purpose being had to the appended claims.

In the drawing, wherein similar reference characters denote similar elements throughout the several views.

Figure 1:
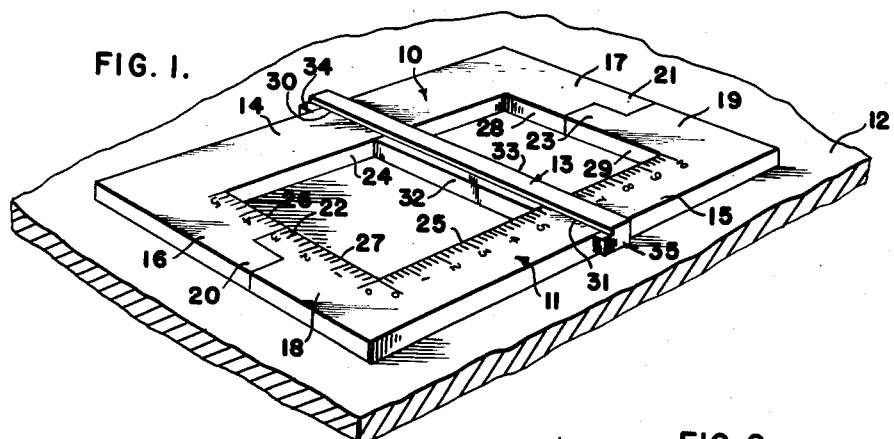
Fig. 1 is an isometric view of a powder block frame or mold constructed in accordance with the principles of the present invention.

Powder block frames or molds embodying the principles of the present invention include a pair of stationary frame members adapted to lie flat on a smooth supporting surface and cooperate with each other to form an open-top three dimensional compartment of fixed, predetermined size, and a movable frame member slidably mounted in the compartment along opposite edges of the stationary frame members to vary the volume of the three dimensional compartment. Graduated scale means are provided on the upper surfaces of the stationary frame members for cooperation with the movable frame member to indicate the variable dimension of the compartment so that the precise volume of the compartment determined by the position of the movable frame member may be quickly determined with absolute accuracy. The contacting surfaces of the cooperative stationary frame members include complementary surfaces to establish an interlocking connection therebetween and provide a stable frame, while the stationary and movable frame members are designed to be disassembled with a small degree of relative movement between the frame members and the powder block so that a minimum disturbing effect will be imparted to the powder block and the characteristics of its formation may be ascertained.

As shown in the drawing, a powder block frame constructed in accordance with the principles of the present invention includes a pair of cooperating stationary frame members 10 and 11 adapted to lie flat on a smooth surface 12 and cooperate in interlocking relationship to form an open-top three dimensional compartment, and a movable frame member 13 slidably mounted with respect to the stationary frame members to vary the size of the three dimensional compartment. The stationary frame members 10 and 11 respectively include longitudinal side portions 14 and 15 provided with pairs of end portions 16, 17 and 18, 19, respectively, extending from opposite ends of the side portions perpendicular to their longitudinal axes. The stationary frame members are formed from rigid stock such as metallic material of rectangular cross section having a width appreciably greater than its depth and with the outer surfaces preferably intersecting at right angles for accuracy and ease of manufacturing. The provision of material having a width materially greater than the depth provides a large area of contact between the stationary frame members and the supporting smooth surface 12 with a resulting high degree of stability.

The free ends of the end portions 16 and 17 cooperate with the free ends of the end portions 18 and 19, respectively, in abutting interlocking relationship to prevent relative longitudinal movement between the stationary frame members while at the same time allowing the members to be disassembled with only a small degree of relative transverse movement. In particular, the free ends of the end portions 16 and 17 comprise a Z-shaped face defining outwardly extending rectangular lugs 20 and 21 having a depth corresponding to the depth of the stationary frame members and a width equal to one half the width of the end portions, and extending coextensively with the outside half of the end portions. The free ends of the end portions 18 and 19 terminate in similar Z-shaped surfaces forming lugs 22 and 23. The lugs 22 and 23 are similar in shape and size to the lugs 20 and 21 but extend from the opposite half of their end portion. Since the lugs 20, 21, 22 and 23 extend equal distances outwardly from the ends of their respective end portion, and are provided with a width dimension equal to one half the width of the end portions, cooperating pair of lugs form complementary surfaces, intermeshing in close relationship, so that the end portions 16, 18 and 17, 19 form continuous end members, of uniform depth and width, of the three dimensional compartment. Since the lugs of each of the stationary frame members are similarly positioned adjacent either the inside or outside edges of the end portions, relative movement lengthwise of the stationary frame members is prevented and a rigid frame is formed. Also, since the lugs extend outwardly from the end portion a relatively small distance only slight relative transverse movement is required to disengage the stationary frame members.

When the stationary frame members 10 and 11 are relatively positioned in interlocked relation as shown, the side and end walls of the three dimensional compartment are defined by the internal surface edges 24 and 25 of the longitudinal side portions 14 and 15, respectively, the internal surface edges 26 and 27 of the end portions 16 and 18, respectively, and by the internal surface edges 28 and 29 of the end portions 17 and 19, respectively. The internal surfaces 24 and 25 are parallel to each other and perpendicular to the parallel surfaces that establish the end dimensions of the compartment. Preferably, the internal surfaces 24, 25, 26, 27, 28 and 29 are perpendicular to a plane parallel to the flat external surfaces of the frame members 10 and 11, and are of equal, predetermined depth.

The movable frame member 13 comprises a rectangularly shaped member, preferably constructed of metallic material of the type constituting the stationary frame members, having a length slightly greater than the total width of the assembled stationary frame members and a width sufficient to provide a rigid member and to maintain precisional relationship with the stationary frame members in a manner that will appear more fully below. The movable frame member 13 is provided with a pair of spaced slots 30 and 31 of rectangular shape having lengths corresponding to the width dimension of the longitudinal side portions 14 and 15. The slots are spaced from each other a distance corresponding to the width of the compartment so that the movable frame member rests on the stationary frame members with the longitudinal side portions lying in the slots. The transverse surfaces of the slots 30 and 31 are parallel to each other and perpendicular to the longitudinal axis of the movable frame member. The movable frame member includes side surfaces 32 and 33 between the slots 30 and 31 parallel to its longitudinal axis and perpendicular to a plane parallel to the upper surfaces of the stationary frame members 10 and 11 or to the flat surface 12. The side surfaces extend downwardly into the compartment and terminate along the bottom of the compartment or adjacent to the smooth surface 12. The outer ends of the slots 30 and 31 are formed by portions 34 and 35 extending downwardly adjacent the outer edge of the stationary frame members. With this construction the movable frame member 13 may be removably mounted on the assembled stationary frame members for sliding movement in the compartment. Since the transverse surfaces of the slots are parallel to each other and to the internal side surfaces 24 and 25 and since the spacing between the slots corresponds to the width of the compartment, the side surfaces 32 and 33 are perpendicular to the internal side surfaces 24 and 25 and parallel to the internal end surfaces 26, 27 and 28, 29 for all positions of the movable frame member.

As mentioned above, the internal wall surfaces of the compartment are of equal and predetermined depth such as one half centimeter, for example. Also, when the stationary frame elements are properly assembled as illustrated, the compartment formed includes a fixed predetermined width such as five centimeters, for example. If desired an appropriate indication may be engraved along one of the width dimensions, such as the scale 36 as shown, to designate this dimension. In order to measure the length dimension and thus provide sufficient information to determine the volume of a given quantity of powder, suitable indicia means in the form of a scale 37 is provided along one of the length dimensions of the compartment, such as in the upper surface of the longitudinal side portion 15. The scale 37 is adapted for cooperation with the side surfaces of the movable frame member 13. For example, the distance between the end walls 26, 27 of the compartment and the movable frame member is indicated on the scale 37 at the point of intersection with the side surface 32. Thus the volume of the three dimensional compartment as determined by the position of the movable frame member 13 may be readily calculated since the depth and width of the compartment are known and since the length dimension may be determined from the scale 37.

Figure 2:
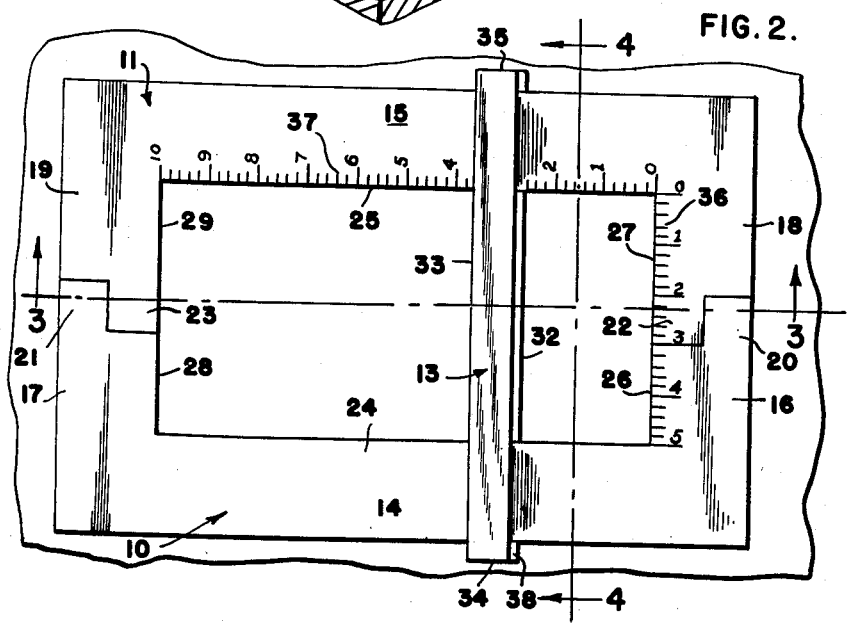
Fig. 2 is a plan view of the powder block frame shown in Fig. 1.
Figure 3:
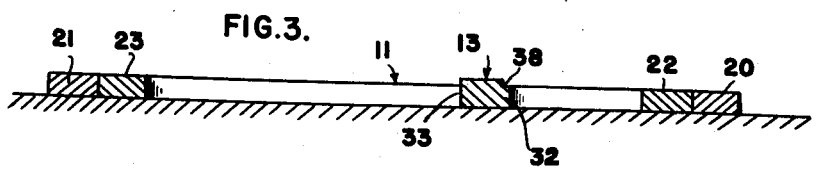
Fig. 3 is a view in section along the line 3—3 of Fig. 2.
Figure 4:
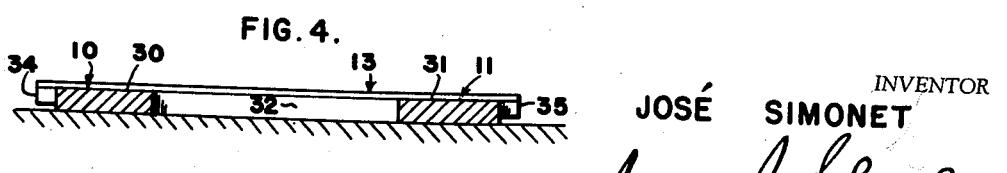
Fig. 4 is a view in section along the line 4—4 of Fig. 2.

When it is desired to determine the exact volume of a given quantity of powder, the powder is placed on a smooth surface such as the surface 12 and the stationary frame members 10 and 11 are moved into cooperating relationship to form an open-top three dimensional compartment enclosing the powder. The movable frame member 13 is then positioned on the stationary frame members with the longitudinal side portions 14 and 15 entering the slots 30 and 31, respectively. The movable frame member 13 is then slid longitudinally of the stationary frame members toward one end of the compartment to enclose the powder, such as the zero line of the scale 37 at the right hand end as viewed in Fig. 2. The movable frame member 13 is slidably positioned in this manner to define a volume equal to the volume of the powder under investigation. The exact position of the member 13 to define this volume is established when the upper surface of the powder lies in the plane of the upper surfaces of the stationary frame members. The powder may be formed to completely fill the compartment by employing a flat bladed instrument and utilizing the upper surfaces of the stationary frame member as guides. In order to aid in this operation, the movable frame member 13 may be provided with a guide formed from a longitudinal slot defining a shoulder 38 lying in the plane of the upper surfaces of the stationary frame members. When the movable frame member is properly positioned to define a compartment completely filled with powder, the unknown length dimension is determined by reference to the line of intersection on the scale 37 by the surface 32. The volume of the compartment, and hence the volume of the powder may then be determined by a simple mathematical process.

After the volume is determined in the foregoing manner, the movable frame member 13 is slid away from the powder and removed from the stationary frame members. Since the slots precisionally contact the longitudinal side portions the member 13 will move equally away from the powder block throughout the surface 32 and will not produce a disturbing effect upon the powder block. Then the stationary frame members may be removed from the powder block. For this purpose the stationary frame members are oppositely moved relative to each other perpendicular to their longitudinal dimensions a distance equal to the length of the lugs 20, 21, 22 and 23. During this movement the stationary frame members maintain the same longitudinal relationship due to the sliding contact between the internal surfaces of the cooperating lugs and it is only necessary to hold one member stationary to prevent movement of the powder block. When engagement between the lugs terminates, the stationary frame members may be moved away from the block of powder without relative frictional movement between the frame members and the powder block. Thus the movable frame member and the stationary frame members may be removed without disturbing the form of the powder block so that the character of the powder block, that is, its physical formation, may be ascertained by observing characteristics of the side formations. Side formation is a good measure of the total powder block formation characteristics and indicates whether or not the volume of the compartment formed is equal to the volume of powder.

There is thus provided by the present invention a novel volume determining device particularly designed for determining precisely the volume of a given quantity of powder. The device is of uncomplicated construction and may be easily manipulated without special intricate adjustments by making simple settings and calculations. Moreover, a volume of powder may be ascertained with a very high degree of precision and any inaccuracy in the measurement may be readily ascertained by observing the character of the powder block formation which is undisturbed when the measuring device is removed to unexpose the powder block.

Although only one embodiment of the invention has been disclosed and described above, it is to be expressly understood that various changes and substitutions may be made therein without departing from the spirit of the invention as well understood by those skilled in the art. For example, the scale 37 may be calibrated in units of volume or provided with volume indications, so that the volume of the powder block may be read directly therefrom. Reference therefore will be had to the appended claims for a definition of the limits of the invention.

What is claimed is:

1. A powder block frame comprising a pair of stationary frame members and a movable frame member, each of the stationary frame members including a longitudinal portion and a pair of transverse portions extending at right angles from opposite ends of the lingitudinal portion, the longitudinal portions and the transverse portions having similar dimensions of rectangular cross section in which the width dimension is substantially greater than the depth dimension and corresponding ends of the transverse portion being provided with complementary surfaces to form a continuous member when the stationary frame members are positioned with respective transverse portions in abutting relation, the stationary frame members adapted to lie on a smooth surface with their width dimension lying flat on the smooth surface, the ends of the transverse portions lying in abutting relation to form an open-top three dimensional compartment having internal side walls perpendicular to the smooth surface with opposite sides in parallel relation and adjacent sides in perpendicular relation, the movable frame member including an intermediate portion extending into the compartment and a pair of end portions adapted for sliding movement on the longitudinal portions of the stationary frame members, the intermediate portion of the movable frame member having side walls perpendicular to the smooth surface and an area corresponding to the transverse cross-sectional area of the compartment, means for slidably mounting the movable frame member with the side surfaces thereof parallel to the transverse side walls of the compartment, and indicia means including graduations carried by a longitudinal portion for indicating the position of the movable frame member with respect to the longitudinal portions of the stationary frame members, whereby the volume of the section of the compartment between the movable frame member and a transverse portion may be determined.

2. A powder block frame comprising a pair of stationary frame members and a single movable frame member, each of the stationary frame members including a longitudinal portion and a pair of transverse portions extending from opposite ends of the longitudinal portion, the longitudinal portions and the transverse portions of the stationary frame members being of rectangular cross section and having a width dimension substantially greater than the depth dimension, the stationary frame members adapted to lie on a smooth surface with the width dimension lying flat on the smooth surface, the corresponding ends of the transverse portions lying in abutting relation to form an open-top three dimensional compartment having internal side portions perpendicular to the smooth surface and with opposite side portion surfaces parallel to each other and with adjacent side portion surfaces perpendicular to each other, the abutting ends of the transverse portions including interlocking joint means preventing relative longitudinal movement between the stationary frame members and requiring relatively small opposed transverse movement to disengage the stationary frame members, and the single movable frame member having a pair of slots spaced by the transverse dimension of the compartment adapted to enclose the longitudinal portions of the stationary frame members, the single movable frame member including an intermediate portion between the slots having a surface perpendicular to the smooth surface and parallel to the transverse side walls of the compartment, and indicia means including graduations carried by one of the stationary frame members for indicating the position of the single movable frame member with respect to the compartment, whereby the volume of a section of the compartment between the movable frame member and a longitudinal portion may be determined.

3. A powder block frame comprising a pair of stationary frame members and a single movable frame member, each of the stationary frame members including a longitudinal portion and the pair of frame members providing a pair of spaced parallel transverse portions extending between the longitudinal portions, each stationary frame member having a pair of abutment faces of complementary configuration with respect to the faces on the other stationary frame member, each stationary frame member having a cross-section with the width dimension substantially greater than the depth dimension and adapted to lie on a smooth surface with the width dimension lying flat on the smooth surface, corresponding abutment faces on the stationary members being in engagement to form the pair of transverse portions and thereby form an open-top three-dimensional compartment having parallel internal side walls perpendicular to the smooth surface, the abutting faces of the stationary frame members being of cooperating interlocking shape for preventing relative longitudinal movement of the stationary frame members, the movable frame member including a rectangular portion having dimensions corresponding to the cross-sectional area of the compartment taken along one of the compartment dimensions, means for movably mounting the movable frame member for sliding movement on the stationary frame members along a second compartment dimension with the rectangular portion extending into the compartment to divide the compartment into expansible and contractable sections and indicia means including graduations carried by a frame member which extends in the direction of the second dimension for indicating the position of the movable frame member with respect to the second dimension, whereby the volume of a section of the compartment may be determined.

4. A powder block frame of the character defined in claim 3 in which the abutment faces of the stationary frame members are of cooperating Z-shape to form oppositely disposed parallel interlocking lugs, and the length of the lugs are relatively small as compared with the width of the transverse members so that the stationary frame members may be freely moved with respect to each other after a relatively short transverse movement in opposite directions.

5. A powder block frame of the character defined in claim 3 in which the abutment faces of the stationary frame members are of cooperating Z-shape to form oppositely disposed parallel interlocking lugs, and the length of the lugs are substantially equal to one-half the width of the transverse members so that the stationary frame members may be freely moved with respect to each other after a relatively short transverse movement in opposite directions.

References Cited in the file of this patent

UNITED STATES PATENTS

| Number | Name | Date |
|---|---|---|
| 937,589 | Freeman | Oct. 19, 1909 |
| 2,506,189 | Attridge | May 2, 1950 |

FOREIGN PATENTS

| Number | Country | Date |
|---|---|---|
| 807,861 | Germany | July 5, 1951 |